United States Patent [19]

McAllister

[11] 4,065,592

[45] Dec. 27, 1977

[54] SOLAR ENERGY ABSORBER

[75] Inventor: Patrick Von McAllister, Salt Lake City, Utah

[73] Assignee: Hercules Incorporated, Wilmington, Del.

[21] Appl. No.: 677,091

[22] Filed: Apr. 14, 1976

[51] Int. Cl.² .............................................. B32B 3/02
[52] U.S. Cl. .......................................... 428/92; 428/95; 428/97; 428/367; 428/408; 428/913
[58] Field of Search .................. 428/85, 92, 95, 96, 428/97, 367, 408, 913; 126/270, 271; 136/206; 29/184, 191.6, 193, 193.5, 195; 60/641

[56] References Cited

PUBLICATIONS

Cuomo, Applied Physics Letters, vol. 26, No. 10, pp. 557–559, May 1975.

*Primary Examiner*—Marion E. McCamish
*Attorney, Agent, or Firm*—Michael B. Keehan

[57] ABSTRACT

An improved solar energy absorber is provided in which the absorber surface is prepared from a multiplicity of fibers having free ends which are tapered and coated with a low emissivity material. The fibers are straight, aligned in a parallel relationship and have diameters of from about 4 to 100 micrometers. The fibers are spaced together very tightly so that the distance between adjacent fibers is from about 1 to 10 micrometers. The fiber surface presents an improved solar trap for absorbing solar energy.

9 Claims, 5 Drawing Figures

SOLAR ENERGY ABSORBER

This invention relates to a device for absorbing solar energy and for conversion of solar energy to other useful forms of energy. More particularly, this invention relates to an improved solar energy absorber which is particularly suitable for use in applications where high temperatures are needed. The solar energy absorber of this invention is an improvement over the solar energy absorber of A. H. Peterson disclosed and claimed in U.S. patent application filed Apr. 14, 1976, Ser. No. 667,093.

Solar energy absorbers are devices used to capture energy from the sun in the form of radiation and to convert this radiation into heat which can in turn be utilized for various purposes. Solar energy absorbers, sometimes referred to as solar collectors, may be used with or without radiation concentration.

Solar collectors are often categorized as either flat-plate collectors or concentrating collectors. Flat-plate collectors are usually, but not always, mounted in a stationary position with an orientation optimized for a particular location and for the time of year in which the solar device is intended to operate. Flat-plate collectors are usually housed within a thermally insulated flat box having a solar window of glass or plastic. The flat-plate collector surface is painted or treated to produce a blackened surface for radiation absorption. A heat absorbing fluid is generally pumped through tubing provided in the interior of the housing for the flat-plate collector to absorb heat from the collector surface.

The flat-plate collector is mechanically simpler than the focusing collector. The focusing collector is comprised of a concentrating reflector, absorbing surface, and orientation device. A typical concentrating reflector is a parabolic mirror. The absorbing surface can be a long coil housed in the center of the area defined by the parabolic mirror. The orientation device is a mechanical means for moving the parabolic mirror-absorber combination in the direction of sunlight during the course of the day.

Flat-plate collectors are designed for applications requiring energy delivery at moderate temperatures, i.e., up to about 250° F. Focusing collectors are used principally for applications requiring delivery of energy at higher temperatures, say, above about 250° F.

A new approach to conversion of solar energy to thermal energy is reported in an article of J. J. Cuomo et al, *Applied Physics Letters*, Vol. 26, No. 10, pp. 557–559, May 1975. In this article the authors describe a micro structure similar in geometry to an acoustic anechoic surface as a solar energy absorber. The surface of this solar energy absorber comprises a dense forest of aligned needle-like protuberances, referred to as dendrites. The dendrites of the energy absorber of Cuomo et al have a spacing between adjacent dendrites of several wavelengths of light. Cuomo et al state that the material which can be used for their absorber is a material which emits poorly in the infrared light region. Cuomo et al describe a solar energy absorber prepared from tungsten single crystal whiskers which are grown on a substrate by vapor deposition of tungsten on the substrate. The process for generation of tungsten vapor for vapor deposition purposes is based on the reduction of tungsten hexafluoride (WF6) by hydrogen at atmospheric pressure. The process for preparation of the solar energy absorber described by Cuomo et al is costly and the energy absorber surface may be difficult to reproduce.

The solar energy absorber of this invention is particularly suitable for use for delivery of energy at high temperatures, about 250° F. and above. At higher temperature applications (above 250° F.) the solar energy absorber of this invention has a high efficiency of energy absorption. The solar energy absorber of this invention can be manufactured at a reasonable cost and the absorber surface is substantially reproducible.

Broadly, in accordance with this invention, an improved solar energy absorber is provided comprising a multiplicity of metallic or nonmetallic fibers, said fibers being stable in air at temperatures of up to 500° F., said fibers being substantially straight and aligned in parallel and side-by-side relationship, substantially all of said fibers having at least one free end, said fibers having diameters of from about 4 micrometers to about 100 micrometers, said fibers being spaced apart such that the distance between adjacent fibers is from about 1 micrometer to about 10 micrometers, the free ends of the fibers being tapered and the free ends of said tapered fibers being coated with a material having an emissivity of less than about 0.05, said coated fibers comprising the solar energy absorbing surface.

The solar energy absorber of this invention is more fully described by reference to the drawings.

Figure 1:
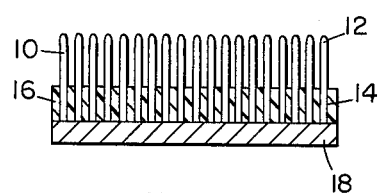
FIG. 1 is a schematic drawing illustrating a simple embodiment of the solar energy absorber of this invention.

In FIG. 1 a solar energy absorber of this invention is illustrated in which a multiplicity of fibers 10 are substantially straight and are aligned in a parallel and side-by-side relationship. The fibers illustrated each have one free end 12 and a fixed end 14 embedded in a substrate 16. The free ends of the fibers 10 comprising the solar energy absorbing surface are each tapered and coated (not shown). In the embodiment illustrated a thermal conductor 18 is adhesively secured to the base of substrate 16.

Figures 2, 3:
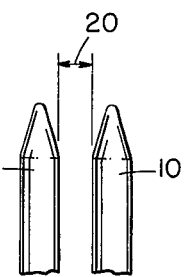
FIG. 2 is a schematic enlargement of adjacent fibers illustrating the spacial relationship of the fibers within the solar energy absorber and the tapering ends of the fibers.
FIG. 3 is a schematic enlargement of adjacent fibers having a greater angle of taper than the fibers illustrated in FIG. 2.

In FIG. 2 a schematic illustrating two adjacent fibers of the solar energy absorber surface is depicted. It can be seen from this schematic that the free ends of the fibers are substantially straight and in a parallel and side-by-side relationship. The space between the adjacent fibers is on the order of about 1 to about 10 micrometers and preferably from about 1 to about 4 micrometers. The free ends of the fibers illustrated are slightly tapered. In FIG. 3 a preferred embodiment of tapered adjacent fibers is illustrated in which the taper of the free ends of the fibers is greater than the taper for the fibers shown in FIG. 2.

Figure 4:
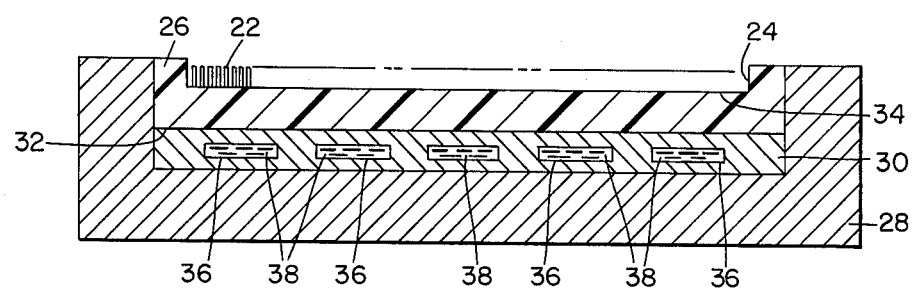
FIG. 4 is an illustration of a solar energy absorbing device which comprises a solar energy absorber, a heat conducting means in communication with said absorber, and means for transferring the thermal energy absorbed by the heat conducting means into a working fluid.

In FIG. 4 an embodiment of the solar energy absorber device of this invention is illustrated. In this device fibers 22, which are substantially straight and aligned in parallel and side-by-side relationship, are inserted into a cavity 24 in a thin graphite dish 26. Graphite dish 26 can be housed within an insulator 28 which surrounds the entire exterior surface of graphite dish 26 for the solar energy absorbing surface. A glass plate (not shown) is used to cover and protect the absorbing surface. A heat conducting plate 30 is secured to the base surface 32 of graphite dish 26 through an adhesive cement 34. Heat conducting plate 30 contains passages 36 though which working fluid 38 can flow. Working fluid 38 absorbs heat within heat conducting plate 30. The rate of flow of working fluid 38 through passages 36 is controlled such that the working fluid 38 is heated to a desired temperature within the limits imposed by the efficiency of the absorber, by the concentration of solar energy and by the efficiency of the absorbing device. Working fluids having moderate boiling points can be converted to gases in the solar energy absorber device of this invention to generate mechanical power directly or to generate electrical power. The working fluid 38 flowing through the cavity 36 of heat conducting plate 30 can also be pressurized by any suitable means, such as a pump. Pressurized working fluid when heated is useful when high operating temperatures are required.

Figure 5:
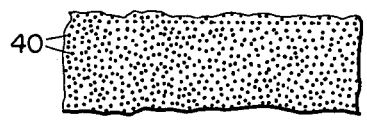
FIG. 5 is a achematic illustration of the surface of a carbon fiber solar energy absorber of this invention.

FIG. 5 is a schematic illustration of a top view of the absorbing surface of the solar absorber of this invention illustrating the individuality of substantially all of the free ends of the fibers 40 which comprise the solar energy absorbing surface.

In the solar energy absorber of this invention the metal or nonmetal fibers employed provide a geometry capable of absorbing solar radiation. Illustrative fibers which can be employed in the solar energy device of this invention include any fibers having a diameter of from about 4 micrometers to about 100 micrometers and which are stable in air at temperatures of up to 500° F. Illustrative nonmetallic fibers include carbon, glass, asbestos, silicon carbide fibers, and the like. Illustrative metal fibers include steel, copper, aluminum, silver, tin, and the like. The term "carbon fibers" is used in this invention in its generic sense and is intended to include both carbon fibers and graphite fibers. Such fibers can be made by processes known in the art such as the process described in U.S. Pat. No. 3,412,062. Carbon fibers used in this invention can be prepared from a large number of precursor materials such as polyacrylonitrile, rayon, pitch, and the like. Carbon fibers are dark in color, usually black, and can be employed in the solar energy absorber of this invention without further treatment. Glass fibers are well known in the art and have been commercially available for many years. The preferred fiber for use in preparing the solar energy absorber of this invention is carbon fiber. Fibers employed are preferably of a dark color or blackened to increase emissivity within the absorber cavities. A principal advantage of the use of carbon fiber in the solar energy absorber of this invention is its high thermal conductivity. The fibers employed in the solar energy absorber of this invention have diameters of from about 4 to about 100 micrometers and preferably from about 4 to about 20 micrometers.

In the solar energy absorber of this invention the fibers must be substantially straight and aligned in a parallel and side-by-side relationship. Alignment can be achieved by any suitable method. Particularly suitable methods are pultrusion and filament winding. In pultrusion the fibers are pulled through a die while the fibers are in contact with a thermoplastic or thermosetting resin, with a molten metal matrix, or with a metal filled resinous matrix such as an epoxy matrix containing particulate metals such as aluminum, under conditions such that the resulting encapsulated fiber composite exiting the die is self-supporting, i.e., retains its basic shape after exiting from the die. The resulting composite is rod-like in form. The composite is permitted to harden and is cut perpendicular to the longitudinal axis of the rod to desired lengths. When preparing large solar energy absorbers, the small sections of the composite can be assembled, for example, like pieces of tile, to form a large absorber surface. Preparation of composites by pultrusion results in fibers which are substantially straight and aligned in a parallel and side-by-side relationship. After cutting of the solar absorber sections the matrix surrounding the fibers is removed from at least one end of the composite structure by means which is suitable, dependent upon the composition of the matrix. Thus, the matrix can be removed by various means such as by burning, by controlled solvation of matrix, by melting, and the like. Sufficient matrix must be removed from one surface of the composite such that the individual fibers at one surface of the composite are substantially free and spaced apart so that the minimum distance between adjacent parallel fibers is from about 1 micrometer to about 10 micrometers. The free, aligned ends of the fiber form the solar energy collecting surface. If desired, substantially all of the matrix can be removed from the composite. It has been found that even though substantially all the resin is removed from the composite, the aligned fibers will retain their position relative to each other in the absorber if handled carefully.

Another method for preparation of the solar energy absorber of this invention is filament winding of the fiber around a mandrel which provides for level winding such that the fibers are substantially straight and are aligned in a parallel and side-by-side relationship. In this process fibers are wound by known methods. For example, the fibers can be passed through a resin bath prior to being wound or the resin can be applied by other methods, such as by spraying the fiber with resin during the winding operation. The resin-wet structure is cured when the resin employed is thermosetting and is cooled when the resin employed is thermoplastic to form a solid composite structure. Sections can be cut from the level wound portion of the resulting composite and the resin can be removed by methods heretofore described. The resulting fibers can be bonded to a heat conducting surface by any suitable means or the fibers can be packed into pockets or cavities in a heat conductive block so that the fibers are in communication with the block. The solar energy absorbed by the absorber is converted to heat and the absorbed heat is transferred through any suitable heat conducting means to perform work.

Fibers employed in the solar absorber of this invention can be embedded directly in a heat conduction metal or metal alloy which in turn is bonded to or forms part of a heat conducting block. This type of bonding is preferred to achieve efficient heat transfer from the fibers. One such method for embedding the fibers in metal includes as a first step the aligning of the carbon fibers in a parallel and side-by-side relationship in a composite structure as heretofore described. The resin is then substantially completely removed from the composite structure by burning the resin from the structure. The fibers remain aligned even though the resin is substantially completely removed. In the case of bonding fibers to metal, one end of each fiber making up the heat conducting surface of the solar absorber can be coated with up to about 1000 angstroms of titanium boride, titanium carbide, or a mixture thereof. The coated ends of the carbon fibers are dipped into a bath of molten metal or metal alloy, and the fibers are then removed from the bath and allowed to cool. A solid metal matrix is formed in which one end of each of the carbon fibers is encapsulated in metal and the opposite end of the fibers is free and functions as the solar energy absorbing surface heretofore described. For a description of a process of forming a carbon fiber—metal composite, see U.S. Pat. No. 3,894,863; reference to which is hereby made. Metal fibers can be bonded to metal by any suitable bonding technique which depends on the particular metal fiber being employed. Methods of bonding metals to metals are well known in the art.

In the solar energy absorber of this invention the combination of the fiber geometry, coating of the fiber ends with a material having low emissivity and tapering the free ends of the fibers comprising the solar energy absorbing surface provides an improved surface wherein solar energy can be trapped, converted into heat, and used to perform work.

For the solar energy absorber of this invention to be highly efficient, it is necessary that the free ends of the fibers be tapered. If the tips of the free ends comprising the energy absorbing surface are flat, the fibers reflect solar energy away from the absorber. Tapered fibers reflect solar energy in to the absorber. The term "tapered fibers" as used herein means that the surface of the fiber normal to the incident radiation is reduced compared to the surface of a flat-ended fiber. Thus, sharply pointed fibers have the smallest surface normal to incident radiation and are preferred. Tapering of the fibers can be accomplished by any suitable means, such as by acid etching, by exposure of the fiber ends to an oxidizing flame, or by sanding or polishing of the absorber surface. The means employed is directly dependent upon the fiber composition. The following table presents exemplary solutions which can be employed to taper fibers by an acid etching process.

Table 1

| Fiber | Tapering Process Solutions |
| --- | --- |
| Carbon | Hot Hydrochloric & Sulfuric Acids |
| Glass | Hydrofluoric Acid Solution |
| Metals | Chemical Milling Standard Solutions |
| Asbestos | Modified HF Solution |
| Silicon Carbide | Modified HF Solution |

In each case a solution is compounded which will attack the fiber material at a controlled uniform rate. The rate can be modified by temperature changes. Exposure is controlled so that the chemical milling effect working on exposed surfaces results in a tapered end on the fiber (rounded or pointed).

In an acid etching process, the free ends of the fibers comprising the energy absorbing surface first initially become rounded and gradually the taper of the fiber ends increases toward a point as the etching process proceeds. The efficiency of the solar absorber of this invention is improved as the degree of the taper of the free ends of the fiber increases until the fibers end in an elongated point, provided other variables are held constant. Acid etching of a solar energy absorber of this invention in which the absorber is prepared from carbon fiber is done as follows. The free ends of the fibers comprising the energy absorbing surface are placed with the free ends down in a shallow tray of acid solution. Many acids are suitable for this purpose, such as sulfuric, phosphoric, nitric, hydrochloric, mixtures of acids, and the like. In a typical acid etching treatment the fibers are placed in a solution of 50% sulfuric acid and 50% hydrochloric acid at a temperature of 150° F. for 4 hours. The time required to taper the ends of carbon fiber, as well as fibers of other compositions, depends upon the concentration of the acids employed, the composition of the acids employed, the temperature at which the etching is conducted and the degree of tapering desired. In general, etching is faster when using strong acids, i.e., acids having a high ionization constant. In general, etching rate also increases as temperature increases. When the ends of the fibers are tapered, the fibers are removed from the acid solutions and rinsed thoroughly with water to remove acid residuals.

Black fibers have high emissivity of above 0.90 compared to an emissivity for gold of 0.02. Emissivity is the ratio of energy loss through radiation of any substance compared to the energy loss by radiation of a perfect black body. To improve the efficiency of the solar absorber of this invention, the tapered free ends of the fibers comprising the solar radiation absorbing surface are coated with a material having an emissivity of less than 0.05. Examples of particularly suitable materials having an emissivity of less than 0.05 which can be employed for coating the tapered tips of the fibers are metals such as gold, chromium, aluminum, and the like. The thickness of the coating of the low emissivity material on the tapered ends of the fiber can be very small. Generally a coating of from about 30 angstroms to about 100 angstroms in thickness is satisfactory.

Coating of the fibers employed in the solar energy absorber of this invention with metal such as gold can be readily carried out in a high vacuum vapor deposition unit. In a typical vapor deposition process a solar energy absorber prepared by a method as described above is placed in the chamber of a vapor deposition unit. This chamber usually contains a basket made of tungsten in which is placed a sufficient amount of gold in solid form to coat the exposed surfaces of the free ends of the fibers which comprise the solar energy absorbing surface. The chamber of the vapor deposition unit is evacuated to a very low pressure of, say, about $10^{-5}$ Torr or less. Electrical current is then passes through the tungsten basket to heat and vaporize the gold. In this process the longitudinal axes of the fibers in the center of the solar energy absorber are spaced from, but directed at, the tungsten basket. A gold film is deposited on all exposed surfaces within the vapor deposition unit so that the tapered ends of the fibers comprising the energy absorbing surface are coated.

The following examples more fully illustrate a method of preparation of the solar energy absorber of this invention. In these examples and throughout this specification, parts and percentages are by weight unless otherwise specified.

EXAMPLE 1

A first solar energy absorber was made by pultruding carbon fiber and an epoxy resin matrix to form a rod-like composite having a rectangular cross-sectional area, and having a width of ¾ inch and a thickness of ½ inch. Two sections are cut from this composite to form a 1 inch square having a thickness of ⅛ inch. The two sections of composite are placed in a mold which is 1 inch deep and 4 inches in diameter. The mold contains uncured silicon rubber. The absorber is pressed into the uncured rubber until only the absorbing surface of the solar energy absorber is not in contact with the rubber. The rubber is then cured at ambient conditions for 24 hours, forming an insulation for the absorber. The surface of the absorber is then polished using 600 grit silicon carbide metallurgical grade sandpaper. The ends of the fibers comprising the solar absorbing surface are partially tapered as a result of polishing. The solar energy absorber is next inserted into the chamber of a vapor deposition unit, Denton Model DV 502. The chamber is evacuated to a pressure of about $1 \times 10^{-5}$ Torr. A gold sample weighing about 0.04 gram is inserted into a tungsten basket in the chamber and a current of 20 amps is passed through the basket until the gold is evaporated completely. The free ends of fiber comprising the absorbing surface of the solar energy absorber are coated with a thin layer of gold, which is calculated to be between 30 and 150 angstroms in thickness. This absorber is a control for evaluation purposes.

EXAMPLES 2-3

Two solar energy absorbers are prepared for comparison with the solar energy absorber of Example 1. Absorbers 2 and 3 are prepared by filament winding of NOL rings. The resin matrix employed is a model casting polyester resin sold under the trade name Castolite by A. B. Buehler, Ltd. Square sections, ¼ inch thick by ¼ inch square are cut from the NOL rings. A discussion of NOL ring specimens and their manufacture may be found in *Plastics Technology*, November 1958, pp. 1017-1024, and Proceedings of 21st Annular Technical Conference, SPI Reinforced Plastics Division, Section 8-D, February 1966. Sixteen ¼ inch sections are assembled to prepare a 'inch square absorber. Each absorber is molded in a 1 inch thick by 4 inch diameter silicon rubber disc following the procedure of Example 1. The absorbing surface of absorber 3 is polished down to 600 grit silicon carbide metallurgical grade sandpaper. As a result of polishing the free ends of the fiber are partially tapered. The resin matrix of each of absorbers 2 and 3 is partially removed using an acetylene torch. The resin is removed to a depth of about 1/16 inch to about ⅛ inch. The free ends of fiber comprising the absorber surface of absorber 3 are coated with a layer of gold about 30-150 angstroms thick following the coating procedure of Example 1.

The three absorbers are then compared. Sunlight is concentrated through a 4½ inch convex lens toward the center of each absorber to a circular area on each absorber ¾ inch in diameter. Thermocouples are bonded to the base of each absorber. Results of exposure of each absorber to the concentrated sunlight are set forth in Table 2 below:

Table 2

| Ex. (Absorber No.) | Temperature, °F. Sunlight Conc. on 1" Diameter Circular Area | Exposure Time (Sec.) | Temperature, °F. Sunlight Conc. on 1" Diameter Circular Area | Exposure Time (Sec.) |
| --- | --- | --- | --- | --- |
| 1 | 300 | 398 | 250 | 525 |
| 2 | 300 | 465 | 250 | 650 |
| 3 | 300 | 192 | 250 | 248 |

EXAMPLE 4

A solar energy absorber device is prepared as follows. Carbon fibers are level wound on a mandrel so that the fibers are straight, parallel and in a side-by-side relationship on sections of the mandrel, and the fibers are bonded together with a polyester matrix. The carbon fiber polyester matrix is cured for 24 hours at 120° F. and then cut into slices approximately ⅛ inch thick. A number of these slices are placed adjacent to each other and are bonded together to form a 6 inch by 6 inch carbon fiber absorber panel. Substantially all of the resin interspersed between the fibers during filament winding is burned out from the panel using an acetylene torch. The panel is bonded to a 6 inch by 6 inch copper plate having a thickness of 0.060 inch. The adhesive cement employed to bond the absorber to the copper plate is an aluminum filled epoxy sold commercially under the trade name Devcon F-2 (liquid) by Devcon Corp., Danvers, Massachusetts. A coil of copper tubing ten feet long and having an inside diameter of 1/16 inch was bonded onto the back of the copper plate. Thermometers were placed in the water stream at the inlet and outlet of the copper coil to measure inlet and outlet temperatures. The solar energy absorber device is potted in a polyurethane foam insulator about 2 inches thick. The tips of the fibers comprising the absorbing surface are coated with gold to a thickness of between 30 and 100 angstroms in a gold vapor deposition unit following the process disclosed in Example 1. The surface of the absorber is sealed with a glass cover plate. The absorber surface area is 0.25 sq. ft. The results of subjecting the absorber to illumination from an arc lamp are set forth in Table 3 below.

Table 3

| Inlet Water Temp. (° F.) | Outlet Water Temp. (° F.) | Water Flow Rate (lbm/hr) | Heat Absorbed by Water (BTU/hr) | Power Received from Arc (BTU/hr) | Ambient Temp. (° F.) | % Efficiency |
| --- | --- | --- | --- | --- | --- | --- |
| 76 | 182 | 4.89 | 527 | 530 | 73 | 99 |
| 82 | 196 | 4.15 | 481 | 522 | 73 | 92 |
| 75 | 136 | 7.19 | 446 | 522 | 73 | 85 |
| 82 | 179 | 4.85 | 478 | 522 | 73 | 92 |
| 73* | 174 | 5.03 | 517 | 522 | 73 | 99 |

*No glass cover used on this test.

EXAMPLE 5

Utilizing the absorber described in Example 4, additional tests are conducted utilizing sunlight as the source of radiant energy. The heat absorbed by the solar energy absorber and the temperatures of water flowing through the solar energy absorbing device at different temperature rates are set forth in Table 4.

Table 4

| Inlet Water Temp. (° F.) | Outlet Water Temp. (° F.) | Water Flow Rate (lbm/hr) | Heat Absorbed by Water (BTU/hr) | Power from Sun (BTU/hr) | Ambient Temp. (° F.) |
| --- | --- | --- | --- | --- | --- |
| 72 | 89 | 3.70 | 64.0 | 72 | 50 |
| 67 | 79 | 5.51 | 67.3 | 66 | 53 |
| 68 | 79 | 5.34 | 59.7 | 66 | 53 |
| 67 | 77 | 5.34 | 54.3 | 63 | 53 |

The solar energy absorber of this invention is an improved absorber and achieves improved efficiency through absorption of radiation by the high emissivity surface and by retaining this energy in the absorber by mechanical trapping of the solar radiation which would normally be re-radiated from the surface of a heated black body. Tapering of the fibers reflects radiant energy into the structure where it is trapped and the low emissivity coating reduce infrared radiation from the tapered fiber tips. The combination of geometry and materials provides a solar absorber surface which presents a high emissivity to incoming radiation and a very low emissivity to re-radiation.

The metallic and nonmetallic fibers which can be employed in the solar energy absorber of this invention are stable in air at temperatures of up to about 500° F., i.e., said fibers do not undergo thermal decomposition in air at up to about 500° F.

What I claim and desire to protect by Letters Patent is:

1. A solar energy absorber comprising a multiplicity of nonmetallic fibers, stable in air at temperatures of up to about 500° F., said fibers being substantially straight and aligned in a parallel and side-by-side relationship, substantially all of said fibers having at least one free end, said fibers having diameters of from about 4 micrometers to about 100 micrometers, said fibers being spaced apart such that the distance between adjacent fibers is from about 1 micrometer to about 10 micrometers, the free ends of the fibers being tapered and the free ends of said tapered fibers being coated with a material having an emissivity of less than about 0.05, said coated free ends of the fibers comprising the solar energy absorbing surface.

2. The solar energy absorber of claim 1 in which the nonmetallic fibers are carbon fibers.

3. The solar energy absorber of claim 2 in which the coating material is gold.

4. The solar energy absorber of claim 1 in which the nonmetallic fibers are glass fibers.

5. The solar energy absorber of claim 4 in which the coating material is chromium.

6. A solar energy absorber device comprising a. a solar energy absorber comprising a multiplicity of nonmetallic fibers, said fibers being stable in air at temperatures of up to about 500° F., said fibers being substantially straight and aligned in a parallel and side-by-side relationship, substantially all of said fibers having at least one free end, said fibers having diameters of from about 4 micrometers to about 100 micrometers, said fibers being spaced apart such that the distance between adjacent fibers is from about 1 micrometer to about 10 micrometers, the free ends of the fibers being tapered and the free ends of said tapered fibers being coated with a material having an emissivity of less than about 0.05, said coated free ends of the fibers comprising the solar energy absorbing surface, and b. heat conducting means in communication with said solar energy absorber for conducting heat therefrom to perform work.

7. The solar energy absorber device of claim 6 in which the nonmetallic fibers are carbon fibers.

8. The solar energy absorber device of claim 6 in which the nonmetallic fibers are glass fibers.

9. The solar energy absorber device of claim 6 in which the fibers have a diameter of from about 4 micrometers to about 20 micrometers.

* * * * *